US011893579B2

(12) United States Patent
Kim et al.

(10) Patent No.: US 11,893,579 B2

(45) Date of Patent: Feb. 6, 2024

(54) METHOD OF REDUCING SMART CONTRACT FEE FOR DAPP, AND RECORDING MEDIUM AND COMPUTE SERVER FOR PERFORMING THE SAME

(71) Applicant: Korea University Research and Business Foundation, Seoul (KR)

(72) Inventors: Hwangnam Kim, Seoul (KR); Seong-Joon Park, Seoul (KR); Jaeseung Lee, Uiwang-si (KR); Nam-Kyung Yoon, Yongin-si (KR)

(73) Assignee: Korea University Research and Business Foundation, Seoul (KR)

( * ) Notice: Subject to any disclaimer, the term of this patent is extended or adjusted under 35 U.S.C. 154(b) by 32 days.

(21) Appl. No.: 17/668,748

(22) Filed: Feb. 10, 2022

(65) Prior Publication Data

US 2023/0126720 A1 Apr. 27, 2023

(30) Foreign Application Priority Data

Oct. 21, 2021 (KR) ........................ 10-2021-0141288

(51) Int. Cl.

*G06Q 20/38* (2012.01)
*G06Q 20/22* (2012.01)
(Continued)

(52) U.S. Cl.

CPC ....... *G06Q 20/3825* (2013.01); *G06Q 20/065* (2013.01); *G06Q 20/102* (2013.01);
(Continued)

(58) Field of Classification Search

None
See application file for complete search history.

(56) References Cited

U.S. PATENT DOCUMENTS

| | | | | |
|---|---|---|---|---|
| 11,522,700 | B1 * | 12/2022 | Auerbach | G06Q 20/065 |
| 11,538,105 | B2 * | 12/2022 | Reses | G06Q 20/38215 |

(Continued)

FOREIGN PATENT DOCUMENTS

| | | |
|---|---|---|
| JP | 6886724 B2 | 6/2021 |
| KR | 10-1936757 B1 | 1/2019 |

(Continued)

OTHER PUBLICATIONS

D. Minarsch, S. A. Hosseini, M. Favorito and J. Ward, "Autonomous Economic Agents as a Second Layer Technology for Blockchains: Framework Introduction and Use-Case Demonstration," 2020 CVCBT, Rotkreuz, Switzerland, 2020, pp. 27-35, doi: 10.1109/CVCBT50464.2020.00007. (Year: 2020).*

(Continued)

*Primary Examiner* — Jacob C. Coppola
*Assistant Examiner* — Eduardo Castilho
(74) *Attorney, Agent, or Firm* — NSIP Law

(57) ABSTRACT

Disclosed is a method of reducing smart contract fees for a decentralized application (DApp). A parameter of a request reception event and a public key of a user are stored in a task queue of a computation server. The computation server performs a task requested by the user, calls a state change function for the performed task from a smart contract, and transmits a transaction result to the user when the transaction result is returned. The user pays, to the smart contract, a fee corresponding to the generation of the request reception event, and the computation server pays, to the smart contract, a fee corresponding to a state change of the smart contract. Thus, by minimizing and uniformizing a fee to be paid by a user of a DApp system, it is possible to increase accessibility to a corresponding DApp.

11 Claims, 6 Drawing Sheets

(51) Int. Cl.
*G06Q 20/10* (2012.01)
*G06Q 20/06* (2012.01)

(52) U.S. Cl.
CPC ....... *G06Q 20/223* (2013.01); *G06Q 20/3827* (2013.01); *G06Q 20/3829* (2013.01); *G06Q 2220/00* (2013.01)

(56) References Cited

U.S. PATENT DOCUMENTS

| | | | | |
|---|---|---|---|---|
| 11,601,498 | B2* | 3/2023 | Jayaram | G06Q 20/389 |
| 2017/0353309 | A1* | 12/2017 | Gray | G06F 21/51 |
| 2021/0103581 | A1* | 4/2021 | Lee | G06F 16/2365 |
| 2021/0174317 | A1 | 6/2021 | Garg et al. | |
| 2021/0329009 | A1* | 10/2021 | Chen | G06F 21/53 |
| 2022/0084013 | A1* | 3/2022 | Kulkarni | G06Q 20/3825 |
| 2022/0318807 | A1* | 10/2022 | Rohlfing | G06Q 20/401 |
| 2022/0392004 | A1* | 12/2022 | Maurer | G06Q 50/18 |
| 2023/0073337 | A1* | 3/2023 | Chan | G06Q 20/405 |
| 2023/0073883 | A1* | 3/2023 | Tierney | G06Q 20/38215 |
| 2023/0095965 | A1* | 3/2023 | Mee | G06Q 20/38 713/168 |
| 2023/0098747 | A1* | 3/2023 | Vijayaraghavan | G06Q 20/3827 705/69 |
| 2023/0101940 | A1* | 3/2023 | Filter | G06Q 20/4097 705/64 |
| 2023/0135313 | A1* | 5/2023 | Hearn | G06Q 20/382 705/71 |
| 2023/0318848 | A1* | 10/2023 | Griffin | H04L 9/0643 713/178 |

FOREIGN PATENT DOCUMENTS

| | | | |
|---|---|---|---|
| KR | 10-2091349 | B1 | 4/2020 |
| KR | 10-2020-0051135 | A | 5/2020 |
| KR | 10-2020-0059234 | A | 5/2020 |
| KR | 10-2020-0074362 | A | 6/2020 |
| KR | 10-2209852 | B1 | 1/2021 |

OTHER PUBLICATIONS

Y. Guan, H. Zheng, J. Shao, R. Lu and G. Wei, "Fair Outsourcing Polynomial Computation Based on the Blockchain," in IEEE Transactions on Services Computing. pp. 1-1. doi: 10.1109/TSC.2021.3054772, 2021, Date of Publication: Jan. 26, 2021. (Year: 2021).*

S. A. Luca and C. Pungila, "A Metric-Based Approach to Modelling a Virtual Machine for Smart Contract Execution," 2020 22nd International Symposium on Symbolic and Numeric Algorithms for Scientific Computing (SYNASC), Timisoara, Romania, 2020, pp. 302-309, doi: 10.1109/SYNASC51798.2020.00055. (Year: 2020).*

Y. Jeng, Y.-c. Hsieh and J.-L. Wu, "Step-by-Step Guidelines for Making Smart Contract Smarter," 2019 IEEE 12th Conference on Service-Oriented Computing and Applications (SOCA), Kaohsiung, Taiwan, 2019, pp. 25-32, doi: 10.1109/SOCA.2019.00012. (Year: 2019).*

C. Zhang, C. Xu, J. Xu, Y. Tang and B. Choi, "GEM^2-Tree: A Gas-Efficient Structure for Authenticated Range Queries in Blockchain," 2019 IEEE 35th International Conference on Data Engineering (ICDE), Macao, China, 2019, pp. 842-853, doi: 10.1109/ICDE.2019.00080. (Year: 2019).*

* cited by examiner

METHOD OF REDUCING SMART CONTRACT FEE FOR DAPP, AND RECORDING MEDIUM AND COMPUTE SERVER FOR PERFORMING THE SAME

CROSS-REFERENCE TO RELATED APPLICATION

This application claims priority to and the benefit of Korean Patent Application No. 10-2021-0141288, filed on Oct. 21, 2021, the disclosure of which is incorporated herein by reference in its entirety.

BACKGROUND

1. Field

The present invention relates to a method of reducing smart contract fees for a decentralized application (DApp), and a recording medium and an apparatus for performing the same, and more particularly, to a technique that makes it possible to reduce an excessive fee charged to a user when issuing a transaction for using a DApp on a blockchain supporting a smart contract.

2. Discussion of Related Art

To change a state on a blockchain, a transaction signed with a cryptographic key must be generated, and a certain amount of fee is charged when the transaction is transmitted to a network. This is due to the form of the blockchain which is in the form of a distributed network. Since there is no centralized server entity, a certain amount of incentive is given to block producers to maintain a corresponding distributed infrastructure. The main source of the incentive is generated from transaction fees.

In the case of general e-commerce and remittance, everything can be processed with just one or two transactions. However, in the case of a game with frequent interaction or an application that requires high-cost calculations, there is a risk that the fee cost experienced by consumers may vary greatly depending on the price of cryptocurrency.

Among the related techniques, a method of calling application binary interface (ABI) smart contract functions through direct node operation is not an accessible method from a general user's point of view, but it is a standard method required for DApp interaction.

How the DApp works on the Ethereum network is that the compiled bytecode of a corresponding smart contract is contained in a block. A user needs to know the signature of a function to execute a specific method, and this is created through the application binary interface (ABI). In the case of the ABI, this can be obtained through a compiler such as sole.

In addition, as another related technique, a method of calling ABI smart contract functions using a cloud service has the same form as the method based on direct node operation except that the node operation is delegated to the cloud. Examples of such services are Infura and Alchemy.

Since the method is not a method of directly operating nodes, there is no need to store ledger information of the Ethereum Mainnet, and also there is no need to set up a network for this. After that, how to execute a specific function of a smart contract is the same as the direct node operation-based method.

The oracle system is a distributed storage technology in which it is almost impossible to forge a blockchain itself, and on-chain data can be accepted as it is. However, when correctly uploading off-chain data, which is external data, problems may arise in terms of data reliability or the like. To solve the problems, the oracle system has been proposed.

Off-chain computation is performed on random number calculations or tasks that require a very high amount of computation, and then, an on-chain transaction is generated by using the oracle system as middleware. By accessing an authorized oracle web page, acquiring external data, and writing the result in a transaction, a node belonging to the network performs operations that are difficult to perform in the chain or manages a large database.

In addition, after authenticating a user in a corresponding exchange server, a general web-based exchange system transmits a transaction as a proxy using a public key and an encryption key of a cryptocurrency account stored in the exchange server. Thus, it is possible to reduce the need for users to directly store and manage cryptocurrency account information, and it is also possible for users to manage their cryptocurrency from anywhere through a Hypertext Transfer Protocol (HTTP) request or response of a web browser.

However, the method of calling ABI smart contract functions through direct node operation has problems in that by directly operating nodes, there are many resources required when using the DApp and in that user experiences may be inconsistent.

First, in order to directly operate nodes, a complex process is involved, such as an operation of securing a sufficient storage space to store a blockchain, securing a sufficient bandwidth to handle network traffic, and setting up a firewall for connection to neighboring nodes. In addition, when a smart contract requests a function that requires a high amount of computation and that performs frequent memory access, the fee increases rapidly, which leads to a phenomenon in which the fee burden of users increases as the Ethereum price increases.

In the method of calling ABI smart contract functions using a cloud service, it is possible to use the DApp by calling a smart contract through the ABI without special settings by delegating node operation to the cloud. Also, accessibility is increased because users do not need to manually configure complicated settings.

However, in the case of such a cloud service, the range that can be used for free is restricted, and a monthly fee must be paid to use the service as in the direct node operation. Accordingly, users may still feel a burden in terms of cost depending on their usage patterns.

Since the oracle system utilizes a system in the form of middleware, the DApp can be easily used in a more abstract way compared to the above-mentioned methods.

If the oracle system works as intended, there is no problem. However, since the oracle system is limited to the role of middleware and is not a business entity that actually operates the DApp, incorrect interactions may occur in the middle process. In addition, since the oracle system has to utilize a certified web system, accessibility may be low and service development or expansion may take a long time. Additional costs are incurred because additional cryptocurrency is required to use the oracle system.

The exchange system is a method in which a user's cryptocurrency account is stored on the exchange server. Thus, the exchange system gives up the advantages of the decentralized system and is exposed to the risks of the centralized system. If the exchange system is hacked, all user cryptocurrency account information (public keys and encryption keys) may be exposed, which may lead to damage such as large-scale cryptocurrency leakage. In addition, there is a problem in that exchanges cannot be prevented from maliciously using account information.

SUMMARY

Accordingly, the technical solutions of the present invention have been conceived in this regard, and an object of the present invention is to provide a method of reducing smart contract fees for a decentralized application (DApp).

Another object of the present invention is to provide a computer-readable storage medium having a computer program recorded thereon for performing the method of reducing smart contract fees for a DApp.

Still another object of the present invention is to provide a computation server for reducing smart contract fees of a DApp.

According to an aspect of the present invention, there is provided a method of reducing smart contract fees for a decentralized application (DApp), the method including operations of receiving a request reception event generated by a smart contract through a request function called from the smart contract by a user and storing a parameter of the received request reception event and a public key of the user in a task queue of a computation server, checking whether a corresponding request reception event has arrived when the computation server receives a request message containing details of a task to be called by the user, allowing the computation server to perform a task requested by the user when it is confirmed that the corresponding request reception event has arrived in a certain period of time, allowing the computation server to call a state change function for the performed task from the smart contract and transmit a transaction result to the user when the transaction result is returned, and allowing the user to check the result transmitted by the computation server and pay, to the smart contract, a fee corresponding to the generation of the request reception event through the request function and allowing the computation server to pay, to the smart contract, a fee corresponding to a state change of the smart contract.

The request function called by the user may include parameters for a remittance amount and a name of a function to be called by the user.

The request reception event generated by the smart contract may include the parameter for the name of the function to be called by the user and a public key of a function caller.

The operation of allowing the computation server to perform a task requested by the user may include an operation of deleting a corresponding record from the task queue when the corresponding request reception event has arrived in the period of time.

The method may further include returning a timeout error to the user as a response when it is not confirmed that the corresponding request reception event has arrived in the period of time.

According to another aspect of the present invention, there is provided a computer-readable storage medium having a computer program recorded thereon for performing the method of reducing smart contract fees of a DApp.

According to still another aspect of the present invention, there is provided a computation server for reducing smart contract fees for a decentralized application (DApp), the server including a queue storage unit configured to receive a request reception event generated by a smart contract through a request function called from the smart contract by a user and store a parameter of the received request reception event and a public key of the user in a task queue, a cross-verification unit configured to check whether a corresponding request reception event has arrived when a request message containing details of a task to be called by the user is received, a request unit configured to perform a task requested by the user when it is confirmed that the corresponding request reception event has arrived in a certain period of time, a result return unit configured to call a state change function for the performed task from the smart contract, receive a transaction result, and then transmit the transaction result to the user, and a fee settlement unit configured to allow the user to check the transmitted result and pay, to the smart contract, a fee corresponding to the generation of the request reception event through the request function and allowing the computation server to pay, to the smart contract, a fee corresponding to a state change of the smart contract.

The request function called by the user may include parameters for a remittance amount and a name of a function to be called by the user.

The request reception event generated by the smart contract may include the parameter for the name of the function to be called by the user and a public key of a function caller.

The request unit may delete a corresponding record from the task queue when the corresponding request reception event has arrived in the period of time.

The result return unit may return a timeout error to the user as a response when it is not confirmed that the corresponding request reception event has arrived in the period of time.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
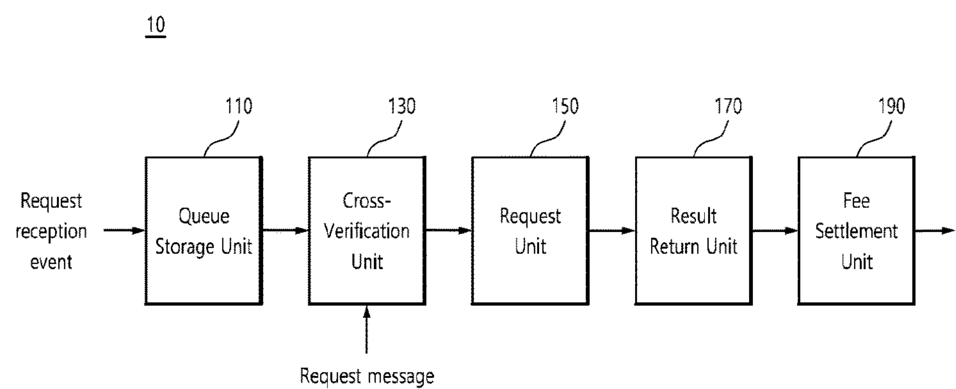
FIG. 1 is a block diagram of a computation server for reducing smart contract fees for a decentralized application (DApp) according to an embodiment of the present invention.

In the following detailed description, reference is made to the accompanying drawings that show, by way of illustration, specific embodiments in which the present invention may be practiced. These embodiments are described in sufficient detail to enable those skilled in the art to practice the present invention. It is to be understood that the various embodiments of the present invention, although different, are not necessarily mutually exclusive. For example, a particular feature, structure or characteristic described herein in connection with one embodiment may be implemented within other embodiments without departing from the spirit and scope of the present invention. In addition, it is to be understood that the location or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar elements throughout the several views.

Hereinafter, exemplary embodiments of the present invention will be described in detail with reference to the drawings.

FIG. 1 is a block diagram of a computation server for reducing smart contract fees for a decentralized application (DApp) according to an embodiment of the present invention.

A computation server 10 for reducing smart contract fees for a DApp according to the present invention (hereinafter referred to as a computation server) is a relay server that is between a smart contract and a user and that is for reducing fees for general users to use DApps and total fees for DApp developers to implement smart contracts.

Referring to FIG. 1, the computation server 10 according to the present invention includes a queue storage unit 110, a cross-verification unit 130, a request unit 150, a result return unit 170, and a fee settlement unit 190.

In the computation server 10 of the present invention, software (application) for performing computations necessary for smart contracts of DApps may be installed and executed. The configurations of the queue storage unit 110, the cross-verification unit 130, the request unit 150, the result return unit 170, and the fee settlement unit 190 may be controlled by the software for performing computations necessary for the smart contracts of the DApp executed in the computation server 10.

The computation server 10 may be a separate terminal or a part of a module of a terminal. Also, the queue storage unit 110, the cross-verification unit 130, the request unit 150, the result return unit 170, and the fee settlement unit 190 may be formed as an integrated module or may be formed of one or more modules. However, on the contrary, each element may be formed as a separate module.

The computation server 10 may be movable or fixed. The computation server 10 may be in the form of a server or an engine and may be referred to by other terms such as a device, an apparatus, a terminal, user equipment (UE), a mobile station (MS), a wireless device, and a handheld device.

The computation server 10 may execute or produce various software programs based on an operating system (OS), that is, a system. The operating system is a system program for enabling software to use hardware of a device, and may include all mobile computer operating systems including Android OS, iOS, Windows mobile OS, Bada OS, Symbian OS and Blackberry OS and all computer operating systems including Windows, Linux, Unix, MAC, AIX, HP-UX, etc.

According to the present invention, a relay server collects generated events on the basis of a starting transaction as a trigger and issues various related interactions to a third server when conditions are matched.

Users may use DApps that take advantages of the decentralization and irreversibility of a blockchain while having a consistent user experience like conventional services. Also, the relay computation server 10 may perform offloading computation on an operation that is difficult to perform in a chain or requires a large gas fee, such as random number extraction.

Smart contracts and DApps based on the smart contracts have the advantage that there is no need for central server operation, but in order to preserve the performance of the blockchain and prevent the abuse of computational/memory resources, fees are set for smart contract actions on a line-by-line basis.

Advantages and goals of the present invention are to remove factors that may hinder the scalability of a DApp system, such as 1) large-capacity data operation, 2) complex computation, and 3) computation difficult to implement with on-chain (random number generation) and to increase access to a corresponding DApp by minimizing and uniformizing fees to be paid from a user's point of view.

The present invention mainly proceeds in two processes. That is, the processes include a process in which a user sends a request with authentication to a blockchain network and a process in which the computation server 10 checks the authentication and the request and performs necessary tasks.

The present invention proposes a system capable of performing high-level computations through a private computation server 10 and storing only information necessary for notarization in a smart contract.

In the case of a conventional off-chain system such as an oracle, only functions performed by a notarized specific off-chain server may be utilized. In other words, if a complex system with high functional restrictions is to be implemented, it is not possible to sufficiently reduce fees through the limited system of the oracle.

In addition, since the cost of using the oracle is charged to a sender of a transaction, the user has to pay an additional fee for using the oracle when he or she directly communicates with a blockchain node.

The present invention proposes a technique capable of guaranteeing the flexibility and scalability of DApp development by proactively performing high-level computations in a private computation server 10 and substituting only data requiring notarization into a smart contract.

In the present invention, by receiving authentication for a user from the computation server 10, performing necessary tasks, and performing a state change of a smart contract by utilizing an event function implemented in a smart contract support network such as Ethereum, the erroneous access of the computation server 10 is blocked.

Since the computation server 10 requests the state change of the smart contract, the computation server 10 will pay a fee. In addition, since the computation server 10 requests a state change only for a result derived after a complex computation, the overall fee is greatly reduced.

Figure 2:
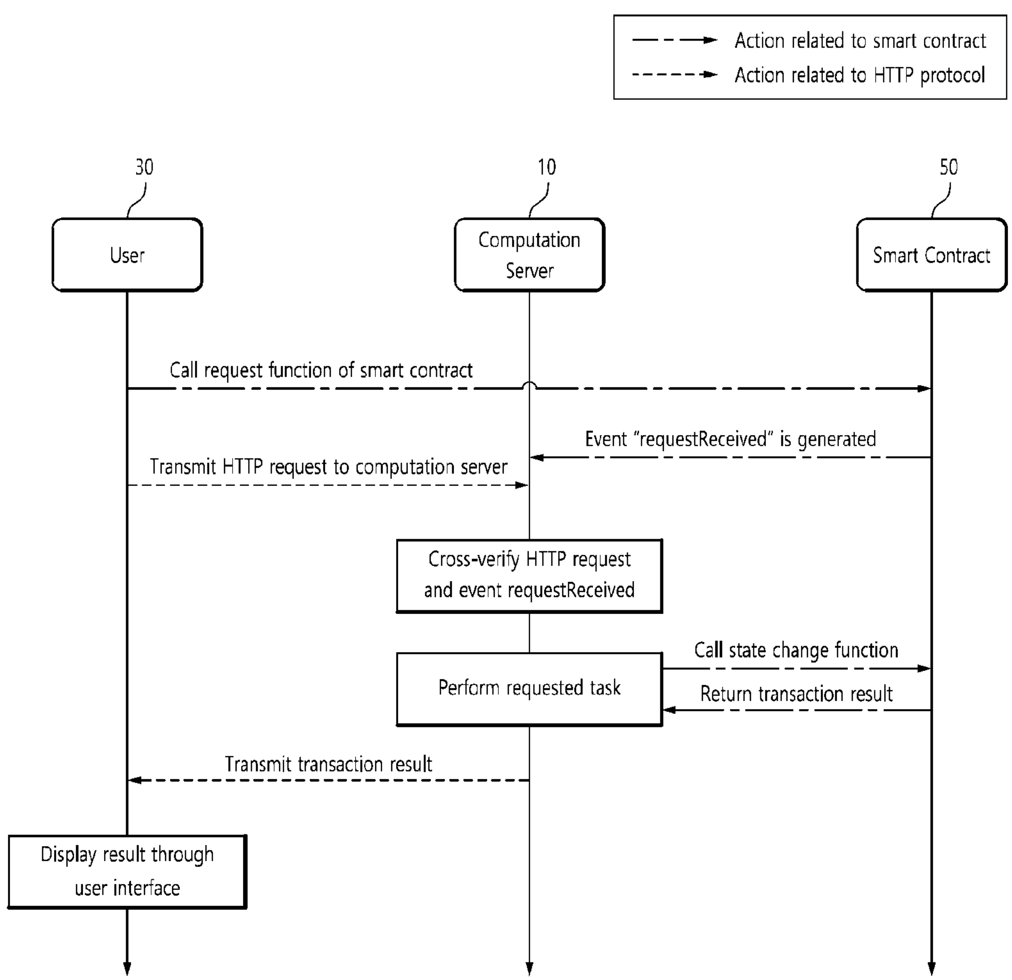
FIG. 2 is a diagram illustrating a process of performing a transaction using a computation server of the present invention.

FIG. 2 is a diagram illustrating the overall execution process of the present invention.

Referring to FIG. 2, the operation process of the present invention is configured in detail as follows.

1) Access control of smart contract and computation server

2) Method of event-based reactive task execution by computation server

3) Call smart contract and return execution result by computation server

First, the access control of a smart contract and a computation server 10 will be described.

A function of the smart contract is called by a transaction of a specific individual user and, as mentioned above, has four essential elements: the signature of the function, the private key of a calling party, the amount of cryptocurrency to be transmitted, and an accompanying fee.

In the present invention, smart contract functions are simplified as much as possible, and complex computations are performed in the computation server 10. Thus, access control for the smart contract functions is essential.

Figure 3:
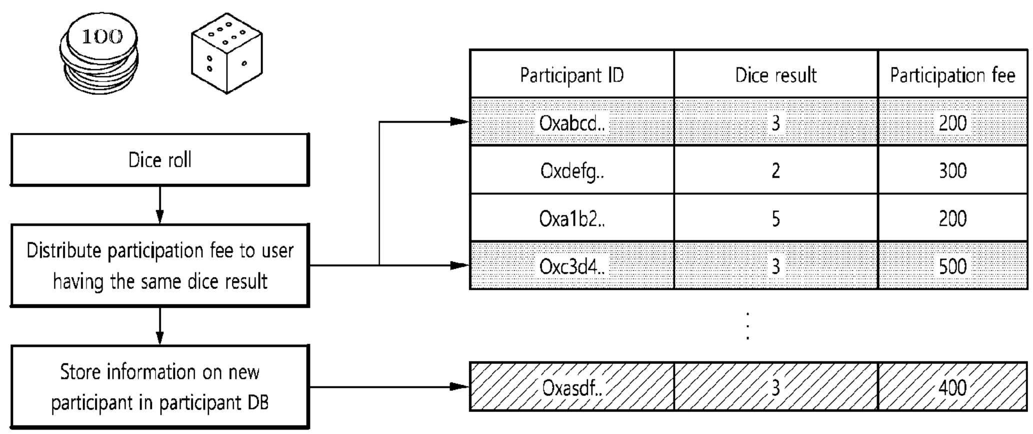
FIG. 3 is a diagram illustrating a roll dice function as an example of access control to a smart contract function.

An example of this is shown in FIG. 3.

For example, a smart contract has a function called rollDice( ), which randomly generates numbers between 1 and 6 corresponding to the number of eyes of the dice. Subsequently, the participation fee is divided and paid to other people who have acquired the corresponding number of eyes, and the number of eyes and the participation fee of the account that called the function are stored.

When the participation fee is divided and paid, the fee is distributed in proportion to participation fees entered by the people. The corresponding function cannot be securely implemented with only pure smart contract functions. A blockchain can derive only definite results and thus cannot generate random numbers by itself.

In detail, even when a random number is generated, all persons who participate in a network must notarize for a long time whether the random number is a really safe random number (whether the random number is not a sequence containing a specific sequence), and thus the generation of a random number is prohibited.

To solve this problem, an oracle is used in the conventional methods. A smart contract function connects to a specific oracle server, receives a random number, and distributes a participation fee to users (mint, transfer, etc.).

The oracle makes it possible to implement the system as above, but if a computation becomes complex, the fee may increase significantly. In the case of EIP-150 among the Ethereum yellow papers, only 3 to 5 gas (fees) is required per arithmetic operation on a variable number generated in a smart contract function, but 20,000 and 5,000 gas is required per word when a variable number is generated in the storage of the smart contract and when the storage of the smart contract is modified, respectively.

Modifying the storage of the smart contract permanently changes the state of the smart contract managed in the blockchain, and thus a high gas consumption appears as above (even a typical cryptocurrency transaction consumes about 20,000 gas).

In the example above, about 20,000 gas is required because only one transaction with the computation in the function for dice eyes is performed. However, as a retrieved storage value gradually increases and the amount of computation increases, the gas consumption may increase significantly, and function execution may become impossible due to a block gas limit.

When the present invention is applied, all detailed computations are entrusted to the computation server 10, and the functions of a smart contract operate only simple storage and a state change.

Figure 4:
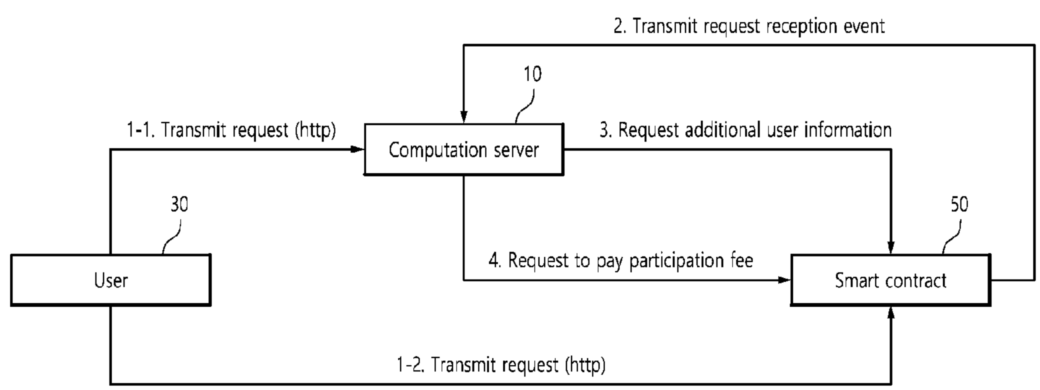
FIG. 4 is a diagram illustrating a process of performing a transaction in a computation server of the present invention.

Referring to FIG. 4, the smart contract uses only the currency transaction function defined in ERC-20, etc., and defines a data structure for storing the numbers of dice eyes of users and a function capable of insertion, deletion, and search for the data structure.

Subsequently, the computation server 10 receives a request from a new participant, generates the number of eyes of the dice through random-number generation, reads the account information and the participation fee of participants having the same number of eyes using a view function, performs a proportional distribution computation, and directly calls the currency transaction function of the smart contract.

Also, information on the number of eyes of the dice and information on the participation fee of the corresponding participant are stored by calling the data structure insertion function of the smart contract. The reception of the request from the participant will be described when an event-based reactive task execution technique of the computation server 10 is described.

In such logic, function information (signature, ABI, etc.) of the smart contract is basically stored in a block and exposed so that any user can perform a function. That is, a function for storing the information on the participant (the number of dice eyes and the participation money) must be performed by only the computation server 10.

To this end, in the case of a function to be performed by only the computation server 10, a process of adding a prerequisite statement that allows only a server to perform the operation is included in the introduction part of the smart contract code according to the present invention. This is called access control, and it can be said that it is an essential prerequisite for the complete separation of computations.

In FIG. 4, for action #1-2, a user bears a fee. The fee is low because the function is a simple function that generates an event. For action #3, no fee is charged. There is no fee because the function is a state view function that does not cause a state change.

For action #4, the computation server bears a fee. A fee cost is low because a pre-task such as proportional distribution is performed in a private server. Access control is required so that the corresponding function can be called only by the computation server.

The event-based reactive task execution method of the computation server 10 will be described below.

Referring to FIGS. 1 and 2 again, the reactive task execution method of the computation server will be described using the above example. A user i) calls a function called request( ) from a smart contract and ii) sends a message containing the details of a task to be called from the computation server.

The function request( ) has a maximum of two parameters. One is the name of a function to be called (rollDice, etc.), and the other is a remittance amount. Since the amount of cryptocurrency to be remitted or whether to remit depends on the function of the smart contract, the corresponding value may be 0. Parameters for the corresponding task are freely input to the computation server 10, and the public key of a caller and the name of the function (rollDice, etc.) are necessarily included.

The function request( ) of i) will be described first. The function request( ) implemented in a smart contract performs the following two operations.

Store transferred cryptocurrency in a smart contract address.

Call an event "RequestReceived." The event has a total of two parameters, i.e., the public key of the function caller and the first factor of the function request( ), that is, "RollDice."

The computation server 10 connects to a network to which the corresponding smart contract is uploaded at the start of the operation, and the queue storage unit 110 implements a handler for the event "Request Received." The event handler's callback function stores the parameters of the event and the public key of the function caller in its own task queue.

The message transmission process of ii) will be described. A message is transmitted through a Hypertext Transfer Protocol (HTTP) request, and the cross-verification unit 130 waits for a certain period of time to determine whether the event of i) for the request has arrived in the http request thread. When the task queue is confirmed, the request unit 150 deletes a corresponding record from the queue and processes the task for rollDice in the computation server 10.

In other words, the request unit 150 determines the number of eyes of the dice, calls information on the existing participants using the view function, pays cryptocurrency, and calls a function that stores user information. When no event has arrived for a certain period of time, the computation server 10 returns a timeout error to the user as a response.

The reason for delivering the double request in this way can be explained by the enhancement of security and the possibility of notarization. When the computation server 10 performs a task through only the message transmission of ii), an unintended task may be performed because a malicious user transmits an http request using another user's public key.

That is, the computation server 10 should be able to check whether the user has made the corresponding http request. Since the smart contract function call includes a process of encrypting a transaction with a private key and decrypting and verifying the transaction in the smart contract, the computation server 10 can confirm that a user having the private key made a request to perform the task through the generation of an event having the same content as the request of ii).

In this case, when the user transmits the http request, he or she may encrypt the details of the request with the private key and transfer the request. However, a third party's notarization of the work transfer details between the user and the computation server 10 is not possible.

The present invention is performed in such a way that the user's work request is announced as an event by utilizing the distributed verification technique, which is a powerful advantage of the DApp, and the request unit 150 of the computation server 10 processes the event. A general user, in addition to the computation server 10, may receive the corresponding event, but the state change of the smart contract cannot be performed due to 1) access control described in the access control of the smart contract and the computation server.

When the task is completed, the result return unit 170 calls a state change function for the performed task to the smart contract, receives a transaction result, and transmits the transaction result to the user.

The fee settlement unit 190 allows the user to check the received result and pay, to the smart contract, a fee corresponding to the generation of the request reception event through the request function and allows the computation server 10 to pay, to the smart contract, a fee corresponding to a state change of the smart contract.

The fees required in the process of the present invention are defined as in Equation 1 below.

$$F_{total}=F_{request}+F_{state\_change}$$

$$F_{oracle}=F_{oracle\_request}+F_{calculation}+F_{state\_change}$$

$$F_{user}=F_{request} \quad \text{[Equation 1]}$$

$F_{total}$: The total amount of fees required in the technique of the present invention $F_{request}$: The total amount of fees used to call the smart contract function request( ) of the present invention $F_{state\_change}$: The total amount of fees used to record the state change of the smart contract as a result of the target task.

$F_{oracle}$: The total amount of fees when the oracle system is used $F_{oracle\_request}$: The total amount of fees used when the smart contract sends a request to the oracle system $F_{calculation}$: The total amount of fees used to perform computations required for the target task $F_{user}$: The total amount of fees the user should pay in the present invention As can be seen from Equation 1 above, when the present invention is utilized, a user pays only a fee corresponding to $F_{request}$ unconditionally irrespective of the type of task performed. Since the function request( ) generates an event only once, a fee of about 20,000 to 40,000 gas is uniformly charged.

Among the total amount of fees described for $F_{total}$, $F_{state\_change}$ is to be paid by the computation server 10. When the oracle system is used, some oracle callback functions are performed by the oracle server. However, basically, additional cryptocurrency coins must be prepared for an oracle request, and functions that are not supported by the oracle are implemented in the smart contract. Eventually, fees required for the functions are to be paid by a user.

According to the present invention, it is possible to guarantee a user's accessibility by recording only items that must be recorded in a chain and by allowing the computation server 10 to perform all other computations and conditional actions and also pay a fee required for the state change.

Figure 5:
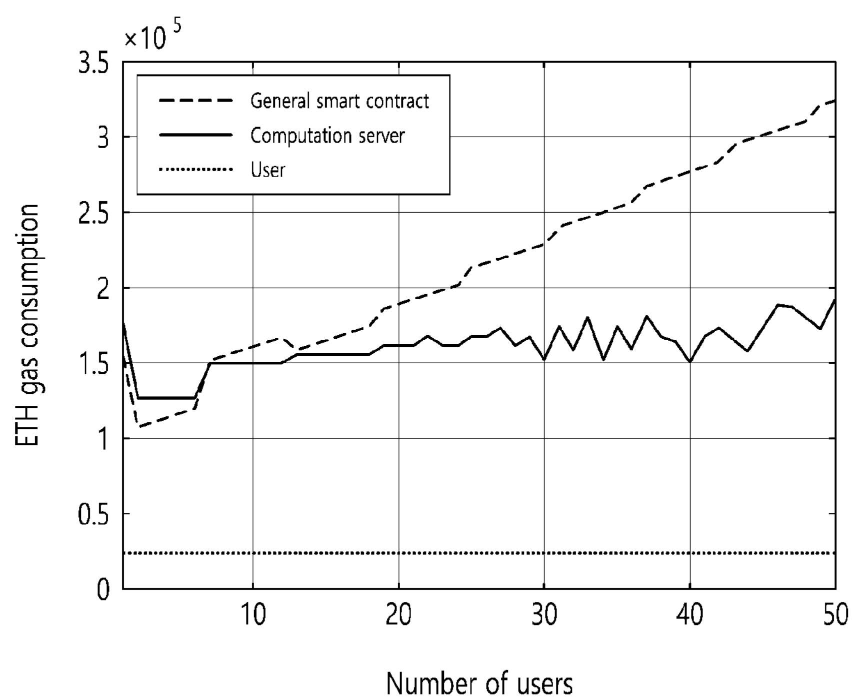
FIG. 5 is a graph showing the amounts of gas consumption when a computation server of the present invention is used and when the computation server is not used.

FIG. 5 is a graph showing the amounts of gas consumption, which are implemented through Solidity and javascript in actual Ethereum testnet Ganache-cli, when the present invention is used and the present invention is not used.

When the previous example is implemented in a pure smart contract, the amount of gas consumed when rollDice( ) is called each time the number of users increases is shown with a dashed line. When the example is implemented according to the present invention, the amount of gas consumption of the computation server 10 when rollDice( ) is called each time is shown with a solid line, and the amount of gas consumption paid by a user is shown with a dotted line.

In the case of a pure smart contract, it is not possible to generate random numbers, so an experiment was conducted by directly inputting evenly the number of eyes. As mentioned above, in the case of the system proposed in the present invention, the function request( ) called by the user is a simple function of generating an event once, which showed a uniform gas consumption of 24,046.

On the other hand, as the number of users increased, the general smart contract showed that the amount of gas consumption increased uniformly. In the previous example, new information is added to a database of the smart contract whenever a new user is added. As the number of users increases, the amount of gas consumption increases because the amount of information to be loaded upon each call increases.

On the other hand, the computation server 10 of the present invention calls information on existing users through a view function implemented in a corresponding smart contract, computes a distribution of a participation fee, and transmits the result to the smart contract to cause a state change.

Since the view function does not consume gas, gas is consumed only for the case of distributing the participation fee and during the process of adding a new user, and the corresponding process shows a uniform consumption as shown in FIG. 5.

The conventional techniques have a system in which fees vary greatly depending on the amount of computation, so there is a great burden for DApp developers to implement various high-level functions. To reduce this burden, a transaction proxy transmission system such as an exchange may be applied, but due to its centralized account management method, there is a threat of a large-scale virtual financial accident when information is leaked.

According to the present invention, it is possible to greatly increase the scalability of the DApp because high-level tasks can be performed at a low fee even though a user directly transmits a transaction and performs authentication. In addition, a service is provided through a computation server that anyone can develop, instead of a system that has limited functions and that may take a long time to expand additional functions like the oracle system. Thus, it is possible to greatly contribute to increasing the size of the DApp market.

Figure 6:
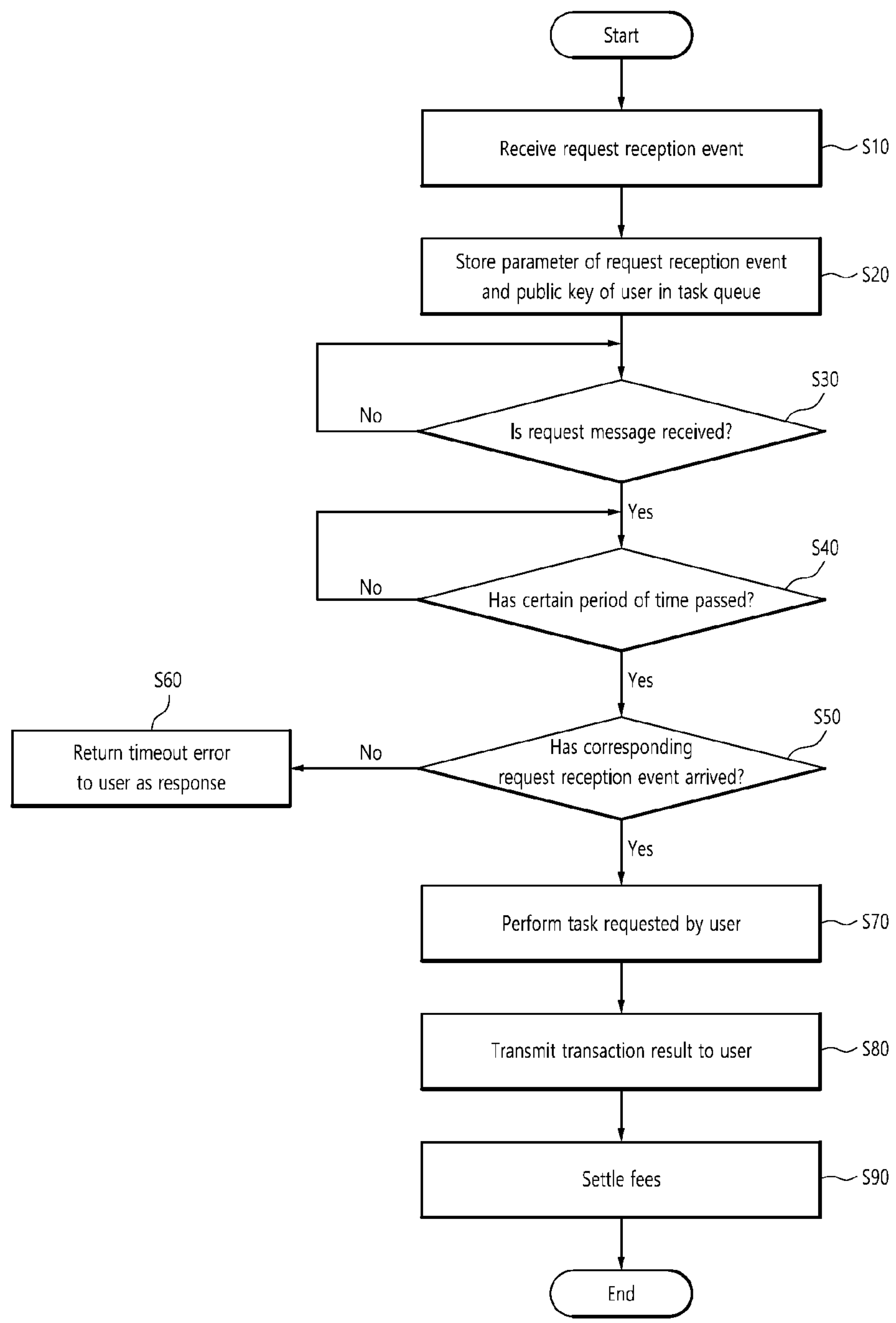
FIG. 6 is a flowchart of a method of reducing smart contract fees for a DApp according to an embodiment of the present invention.

FIG. 6 is a flowchart of a method of reducing smart contract fees for a DApp according to an embodiment of the present invention.

The method of reducing smart contract fees for a DApp according to an embodiment may be performed by substantially the same configuration as the computation server 10 of FIG. 1. Accordingly, the same components as those of the computation server 10 of FIG. 1 are given the same reference numerals, and repeated descriptions thereof will be omitted.

Also, the method of reducing smart contract fees for a DApp according to an embodiment may be executed by software (application) for performing a computation necessary for a smart contract of the DApp.

The method of reducing smart contract fees for a DApp according to an embodiment may be performed by the computation server of FIG. 1, which is a relay server that is between a smart contract and a user and that is for reducing fees for general users to use DApps and total fees for DApp developers to implement smart contracts.

The present invention proposes a technique capable of guaranteeing the flexibility and scalability of DApp development by proactively performing high-level computations in a private computation server and substituting only data requiring notarization into a smart contract.

Referring to FIG. 6, in the method of reducing smart contract fees for a DApp according to an embodiment, a request reception event generated by a smart contract through a request function called from the smart contract by a user is received (operation S10).

Here, the request function called by the user may include parameters for a remittance amount and a name of a function to be called by the user. The request reception event may be generated by the smart contract and may include the parameter for the name of the function to be called by the user and a public key of a function caller.

A parameter of the received request reception event and a public key of the user are stored in a task queue of a computation server (operation S20).

When the computation server receives a request message including details of a task to be called by the user (operation S30), whether the corresponding request reception event has arrived is checked (operation S50). Through this cross-verification, it is possible to increase the enhancement of security and the possibility of notarization.

When it is confirmed that the corresponding request reception event has arrived (operation S50) in a certain period of time (operation S40), the computation server deletes a corresponding record from the task queue and performs a task requested by the user (operation S70).

On the other hand, when it is not confirmed that the corresponding request reception event has arrived in the period of time, a timeout error is returned to the user as a response (operation S60).

When a transaction result on the performed task is returned by calling a state change function from the smart contract, the computation server transmits the transaction result to the user (operation S80).

Also, the user confirms the result received from the computation server and pays a fee corresponding to the generation of the request reception event through the request function to the smart contract, and the computation server pays a fee corresponding to a state change of the smart contract to the smart contract (operation S90).

According to the present invention, the user pays only a fee for an event generated once by the function request( ) unconditionally regardless of the type of task performed, and thus it is possible to greatly reduce fees.

Also, according to the present invention, it is possible to guarantee a user's accessibility by recording only items that must be recorded in a chain and by allowing the computation server to perform all other computations and conditional actions and also pay a fee required for the state change.

The method of reducing smart contract fees for a DApp may be implemented using an application or implemented in the form of program instructions executable through various computer elements and then may be recorded in a computer-readable recording medium. The computer-readable recording medium may include a program instruction, a data file, a data structure, and the like alone or in combination.

The program instructions recorded on the computer-readable recording medium may be designed and configured specifically for the present invention or may be publicly known and usable by those who are skilled in the field of computer software.

Examples of the computer-readable recording medium include magnetic media such as a hard disk, a floppy disk, and a magnetic tape, optical media such as a compact disc-read only memory (CD-ROM) and a digital versatile disc (DVD), magneto-optical media such as a floptical disk, and hardware devices such as a ROM, a random access memory (RAM), and a flash memory, which are specially designed to store and execute program instructions.

Examples of the computer instructions include not only machine language code generated by a compiler, but also high-level language code executable by a computer using an interpreter or the like. The hardware device may be configured to operate as one or more software modules in order to perform operations of the present invention, and vice versa.

According to the method of smart contract fees of a DApp, it is possible to greatly increase the scalability of the DApp because high-level tasks can be performed at a low fee even though a user directly transmits a transaction and performs authentication. In addition, a service is provided through a computation server that anyone can develop, instead of a system that has limited functions and that may take a long time to expand additional functions like the oracle system. Thus, it is possible to greatly contribute to increasing the size of the DApp market.

Although the present invention has been described with reference to exemplary embodiments, it will be understood that various changes and modifications may be made herein without departing from the scope and spirit of the present invention defined in the appended claims.

INDUSTRIAL APPLICABILITY

The present invention is compatible with smart contract systems and can be applied to any types of chain networks that support DApp development platforms. Also, in terms of significantly lowering a user's fees, it is possible to greatly increase the range of end users by, for example, encouraging smart contract-based blockchain activities of the Internet of Things, and the same scheme may be applied to various systems that require a high-level distributed verification system. In other words, the present invention is a core technology that can be applied to ensure the scalability of the platform in any type of system with the format of smart contracts and thus that can overcome market development impediments such as fees for existing DApps.

What is claimed is:

1. A method of reducing smart contract fees for a decentralized application (DApp), the method comprising operations of:

receiving, by a computation server, a request reception event generated by a smart contract through a request function called from the smart contract by a user;

storing a parameter of the received request reception event and a public key of the user in a task queue of the computation server;

checking whether a corresponding request reception event has arrived when the computation server receives a request message containing details of a task to be called by the user;

performing, by the computation server, a task requested by the user in response to confirmation that the corresponding request reception event has arrived in a certain period of time;

calling, by the computation server, state change function for the performed task from the smart contract, receiving a transaction result, and then transmitting the transaction result to the user;

controlling access for the user to check the transaction result transmitted by the computation server and pay, to the smart contract, a fee corresponding to the request reception event through the request function; and paying, by the computation server to pay, to the smart contract, a fee corresponding to a state change of the smart contract.

2. The method of claim 1, wherein the request function called by the user comprises parameters for a remittance amount and a name of a function to be called by the user.

3. The method of claim 1, wherein the request reception event generated by the smart contract comprises the parameter for the name of the function to be called by the user and a public key of a function caller.

4. The method of claim 1, wherein the operation of allowing the computation server a task requested by the user comprises an operation of deleting a corresponding record from the task queue when the corresponding request reception event has arrived in the period of time.

5. The method of claim 1, further comprising returning a timeout error to the user as a response when it is not confirmed that the corresponding request reception event has arrived in the period of time.

6. A non-transitory computer-readable storage medium having a computer program recorded thereon configured to perform the method of claim 1.

7. A server for reducing smart contract fees for a decentralized application (DApp), the server comprising:

at least one processor and at least one memory configured to receive a request reception event generated by a smart contract through a request function called from the smart contract by a user and store a parameter of the received request reception event and a public key of the user in a task queue;

check whether a corresponding request reception event has arrived when a request message containing details of a task to be called by the user is received;

perform a task requested by the user when it is confirmed that the corresponding request reception event has arrived in a certain period of time;

call a state change function for the performed task from the smart contract, receive a transaction result, and then transmit the transaction result to the user; and control access by the user to check the transaction result and pay, to the smart contract, a fee corresponding to the request reception event through the request function; and pay, to the smart contract, a fee corresponding to a state change of the smart contract.

8. The server of claim 7, wherein the request function called by the user comprises parameters for a remittance amount and a name of a function to be called by the user.

9. The server of claim 7, wherein the request reception event generated by the smart contract comprises the parameter for the name of the function to be called by the user and a public key of a function caller.

10. The server of claim 7, wherein the at least one processor is further configured to:

delete a corresponding record from the task queue when the corresponding request reception event has arrived in the period of time.

11. The server of claim 7, wherein at least one processor is further configured to:

return a timeout error to the user as a response when it is not confirmed that the corresponding request reception event has arrived in the period of time.

* * * * *